UNITED STATES PATENT OFFICE 2,385,721

ZEIN MOLDING COMPOSITIONS AND METHOD OF MOLDING

Victor A. Navikas, Lancaster, Pa., assignor to Armstrong Cork Company, Lancaster, Pa., a corporation of Pennsylvania No Drawing. Application November 27, 1943,
Serial No. 512,044

7 Claims. (Cl. 18—55)

My invention relates to zein molding compositions containing filler, zein, and a certain pine wood resin, and to a method of molding such compositions, and it is primarily concerned with the elimination of the expensive, time consuming step of lowering the temperature of the dies before removal of a molded article from a hot mold after the thermoplastic composition has been molded under heat and pressure.

Heretofore, compositions comprising filler, zein, and a thermoplastic resin or gum, for example, copal gum, batu gum, rosin, B rosin, polymerized B rosin, shellac, or the like, have been molded under heat and pressure, but with all these compositions, it has been necessary to first heat the material in a hot mold to render the material flowable and then to reduce the mold temperature before removing the molded article. These resins or gums are thermoplastic in that they do not react under heat and pressure to form an infusible mass as do the thermosetting resins, such as phenol aldehyde and urea aldehyde resins. This step of reducing the mold temperature is expensive and time consuming and, as a consequence, thermosetting resins which undergo a chemical reaction to form infusible products have been used for this and other reasons.

The primary object of this invention is to eliminate the necessity of reducing the mold temperature before removing the molded article when molding compositions comprising filler, zein, and a thermoplastic resin are employed.

Another object of this invention is to provide such compositions which may be readily molded under heat and pressure without lowering the mold temperature before removal of the finished article.

I have discovered that if a molding composition comprising filler and binder including zein and a thermoplastic resin is formulated within certain critical limits, the compositon may be molded under heat and pressure and the molded article removed without lowering the mold temperature. Thus, I have been able to eliminate the time-consuming and expensive step of lowering the mold temperature every time an article is molded.

These and other objects and advantages will become more clear from the following detailed description in which all proportions and percentages are by weight unless otherwise set forth.

My molding compositions are prepared from a mixture of filler and a binder essentially consisting of from about 67% to about 75% by weight of zein and from about 33% to about 25% by weight of the substantially gasoline-insoluble fraction of pine wood resin. The composition may be molded in a hot mold at a temperature of from about 250° F. to about 300° F. and the molded article removed from the mold without materially reducing the mold temperature. This is especially surprising for if a higher percentage of this fraction of pine wood resin or if a higher molding temperature is employed, it is necessary to reduce the mold temperature to prevent sticking and/or distortion of the molded article. If a lower percentage of this fraction of pine wood resin or if a lower temperature is employed, the binder will not flow sufficiently to uniformly coat the filler particles and produce a uniform product having sufficient strength.

Furthermore, I have discovered that it is impossible to obtain equivalent results with the use of any other protein or by the use of any other thermoplastic resin or gum which has heretofore been recommended as a modifying agent for zein.

Zein is a well-known alcohol-soluble protein derived from corn.

The above referred to resin is characterized by being substantially insoluble in gasoline and may, for example, be prepared by chipping pine wood, preferably Southern long leaf pine stump wood, steaming and extracting with a coal tar hydrocarbon, such as benzol, evaporating the solvent, and removing the turpentine and pine oil by distillation. The residue is extracted, preferably at an elevated temperature, with a petroleum hydrocarbon selective solvent, such as gasoline, petroleum ether or the like, to remove the FF rosin. After this extraction, a dark colored resinous substance remains which, when freed from occluded gasoline, constitutes this pine wood resin. This resinous substance will hereinafter be referred to as the "substantially gasoline-insoluble fraction of pine wood resin," though it may contain a minor fraction, about 15%, that is gasoline soluble.

A wide variety of organic fillers, mineral fillers, or fibrous fillers may be employed. For example, wood flour, calcium silicate, magnesium silicate, kraft paper, and the like, or mixtures thereof may be used.

The following detailed example illustrates my invention but does not limit my invention to the exact proportions except as set forth in this specification and the appended claims.

Example

A molded threaded closure was prepared as follows:

| | Parts |
|---|---|
| Zein | 75 |
| Substantially gasoline-insoluble fraction of pine wood resin | 25 |
| Wood flour | 30 |
| Calcium stearate | 1.5 |

Calcium stearate is a well-known mold lubricant which is widely used in the molding art. Other well-known mold lubricants may be employed.

The above ingredients were mixed in a ball mill until a homogeneous mixture and uniform distribution of the binder particles over the filler particles was obtained. This mixture was then pilled or densified under pressure.

The pill was placed in a mold of conventional design and of such contour as to produce a threaded cap. Both the male and female die portions were heated sufficiently to heat the composition to a temperature of about 275° F. for a period of about one minute. The mold was opened and the male portion of the die removed and the molded cap unscrewed therefrom all without any appreciable drop in the mold temperature.

If less resin is used in the above example, the zein-resin binder will not flow properly and if more than 33 parts of resin to each 66 parts of zein are used, the molded article will stick in the mold unless the mold is cooled.

Thus, when employing such a molding composition including a permanently thermoplastic resin, it is possible to follow substantially the same molding cycle which has heretofore been limited to the molding compositions essentially comprising thermosetting resins. As previously pointed out, if rosin or other thermoplastic resin or gum is substituted for the particular resin set forth above, the mold temperature must be materially reduced before the molded article is removed.

Other fillers and other proportions of filler to zein-resin binder may be employed. For example, in my copending application, Serial No. 512,045, filed November 27, 1943, I disclose a composition comprising zein, resin, and kraft paper fibers which also may be formed at a temperature between 250° F. and 300° F. and the article removed at substantially this same temperature when the zein and resin are in the proportions herein set forth. As herein used, the term "molding" shall not only include the type of molding set forth in my example but also shall include the type of forming operation described in my above referred to application.

Having described my invention in detail, it is obvious that certain modifications and alterations may be made all without departing from the spirit or scope of my invention, except for those limitations as to proportions of zein and resin and as to the molding temperature ranges that have been designated as critical.

I claim:

1. In the method of manufacturing a molded article from a molding composition comprising filler, and binder including from about 67% to about 75% by weight of zein and from about 33% to about 25% by weight of the substantially gasoline-insoluble fraction of pine wood resin, said method comprising the steps of molding said composition at a temperature of from about 250° F. to about 300° F. to form a molded article, and removing said article from the mold at substantially the molding temperature.

2. In a method of manufacturing a molded article from a molding composition comprising filler and a thermoplastic binder, the steps comprising charging the mold with a molding composition comprising filler and a binder of zein and the substantially gasoline-insoluble fraction of pine wood resin in the ratio of about 3:1 to about 2:1, applying heat and pressure to said molding composition to cause the same to assume the contour of the mold and to elevate the molding composition to a temperature between about 250° F. and 300° F., maintaining heat and pressure until said binder has been caused to bind the composition into an article having the contour of the mold, opening the mold while heated to substantially said molding temperature, and removing the molded piece therefrom.

3. The method of manufacturing a molded article from a molding composition including filler and a binder containing about from 67% to 75% by weight of zein and about from 33% to 25% by weight of the substantially gasoline-insoluble fraction of pine wood resin, said method comprising the steps of molding such a composition at a temperature between about 250° F. and 300° F. whereby said composition is softened and caused to assume the shape of said mold; opening the mold and removing the molded article without lowering the temperature.

4. A method in accordance with claim 2 in which the molding temperature is about 275° F.

5. A molding composition which may be molded at a temperature of from about 250° F. to about 300° F. to form an article removable from the hot mold at the molding temperature, said composition comprising filler and binder essentially consisting of from about 67% to about 75% by weight of zein and from about 33% to about 25% by weight of the substantially gasoline-insoluble fraction of pine wood resin.

6. A molding composition in accordance with claim 5 in which the binder essentially consists of about 75% by weight of zein and about 25% by weight of the substantially gasoline-insoluble fraction of pine wood resin.

7. A molding composition which may be molded at a temperature of from about 250° F. to about 300° F. to form an article removable from the hot mold at substantially molding temperature, said molding composition comprising a wood flour filler, a mold lubricant, and a binder essentially consisting of about 75% by weight of zein and about 25% by weight of the substantially gasoline-insoluble fraction of pine wood resin.

VICTOR A. NAVIKAS.